Figure 1:
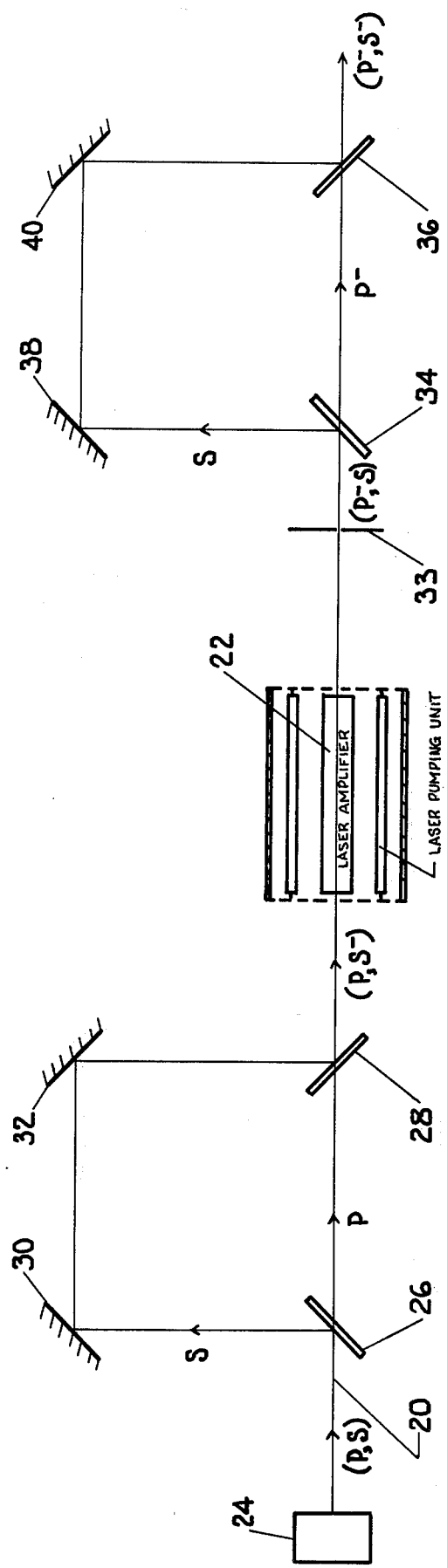

United States Patent [19]

Brueckner et al.

[11] 4,019,151

[45] Apr. 19, 1977

[54] MULTIPLE PASS LASER AMPLIFIER SYSTEM

[75] Inventors: Keith A. Brueckner; Siebe Jorna, both of La Jolla, Calif.; N. Kent Moncur, Ann Arbor, Mich.

[73] Assignee: KMS Fusion, Inc., Ann Arbor, Mich.

[22] Filed: Apr. 26, 1974

[21] Appl. No.: 468,176

[52] U.S. Cl. .............................. 330/4.3; 350/174; 331/94.5 R
[51] Int. Cl.² .......................................... H01S 3/00
[58] Field of Search ............... 330/4.3; 331/94.5 C, 331/, 94.5 S, 94.5 M; 350/169, 174

[56] References Cited

UNITED STATES PATENTS

| | | | |
|---|---|---|---|
| 3,447,856 | 6/1969 | Lange | 350/169 |
| 3,514,709 | 5/1970 | Jacob | 330/4.3 |
| 3,521,069 | 7/1970 | De Maria et al. | 250/199 |
| 3,597,695 | 8/1971 | Swain et al. | 330/4.3 |
| 3,676,796 | 7/1972 | Weber | 331/94.5 C |
| 3,740,664 | 6/1973 | Freiberg et al. | 331/74.5 S |

*Primary Examiner*—Maynard R. Wilbur
*Assistant Examiner*—T. M. Blum
*Attorney, Agent, or Firm*—Barnes, Kisselle, Raisch & Choate

[57] ABSTRACT

A laser amplification method for increasing the energy extraction efficiency from laser amplifiers while reducing the energy flux that passes through a flux limited system which includes apparatus for decomposing a linearly polarized light beam into multiple components, passing the components through an amplifier in delayed time sequence and recombining the amplified components into an in phase linearly polarized beam.

20 Claims, 4 Drawing Figures

MULTIPLE PASS LASER AMPLIFIER SYSTEM

This invention relates to a Multiple Pass Laser Amplifier System and more particularly to a method and apparatus for achieving laser amplification.

In laser systems utilizing numerous amplification stages, the expense of the amplifiers becomes a significant factor. Where a large output (kilojoules) is sought, the problem of amplifier life is, therefore, significant. The present invention is directed to utilizing laser amplifier systems, whether the rod type or the disc type, so as to extract more energy from each amplifier while reducing the danger of damage.

In the operation of laser amplification wherein there is sought a coherent light beam, it is known that the so-called pumping lights are exposed to the laser amplifier, for example, a ruby rod, for quite a considerable period prior to the laser pulse. In some cases, the laser pulse may be in the order of $10^{-9}$ seconds and the pumping lights may be on for several hundred microseconds to cause the storage of energy in the rod. Furthermore, a single pulse through a pumped rod does not deplete all the stored energy. The pumped rod can, at this point of energy, be utilized for two or more pulses but there has been no effective way to incorporate this capacity into a single system. It has been proposed to pass two laser beams through an amplifier at different angles but this does not solve the problem of obtaining a single laser beam with multiple amplifications achieved with a single amplifier.

Thus it is an object of the present invention to provide a system and apparatus which increases the effective gain and energy extraction from laser amplifiers having a limited power flux capacity. It is a further object of the invention to provide a system which has minimal alignment problems in the handling of the laser output beam. A further object is the provision of a laser gain system which is applicable to both rod type amplifiers and disc type amplifiers.

Other objects and features of the invention will be apparent in the following description and claims in which are set forth the principles of operation of the invention in connection with the best modes presently contemplated for the use and practice of the invention.

Drawings accompany the invention and the various views thereof may be briefly described as:

FIG. 1 — a diagrammatic optical circuit diagram of a first embodiment of the invention.

Figure 2:
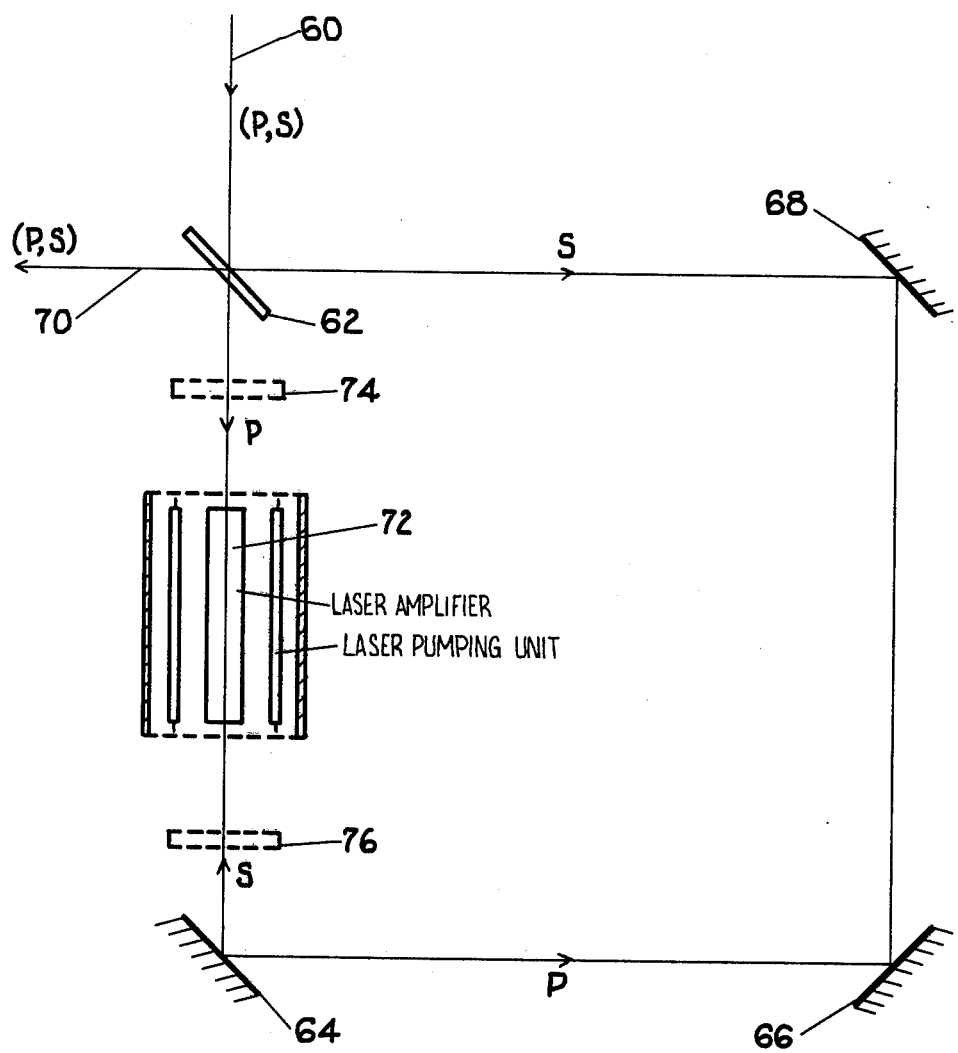

FIG. 2 — a diagram of a second embodiment of the invention.

Figure 3:
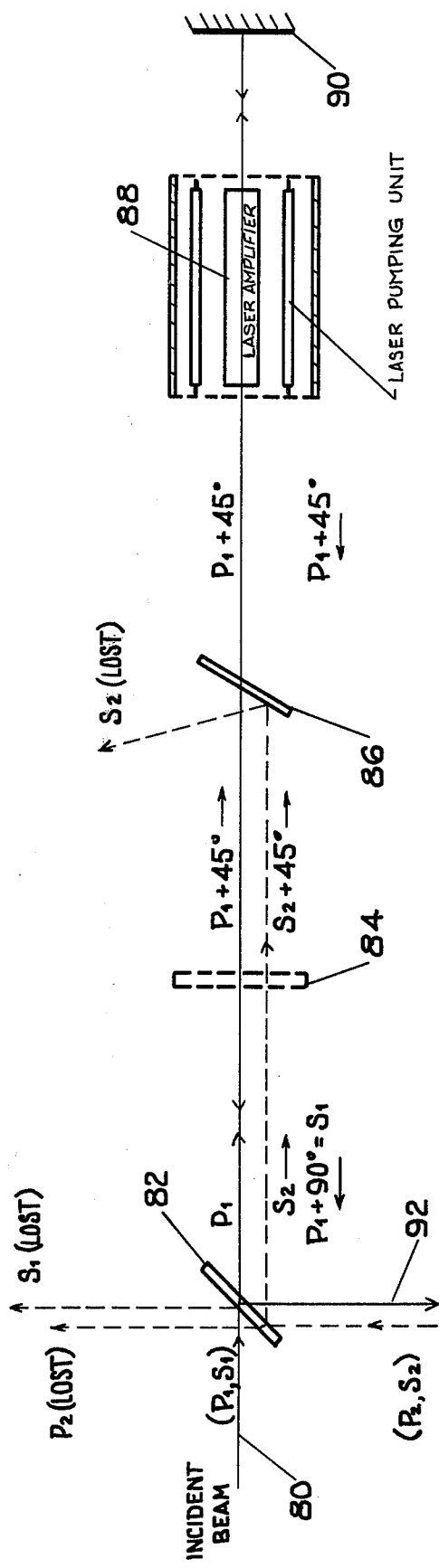

FIG. 3 — a diagram of a third embodiment of the invention.

Figure 4:
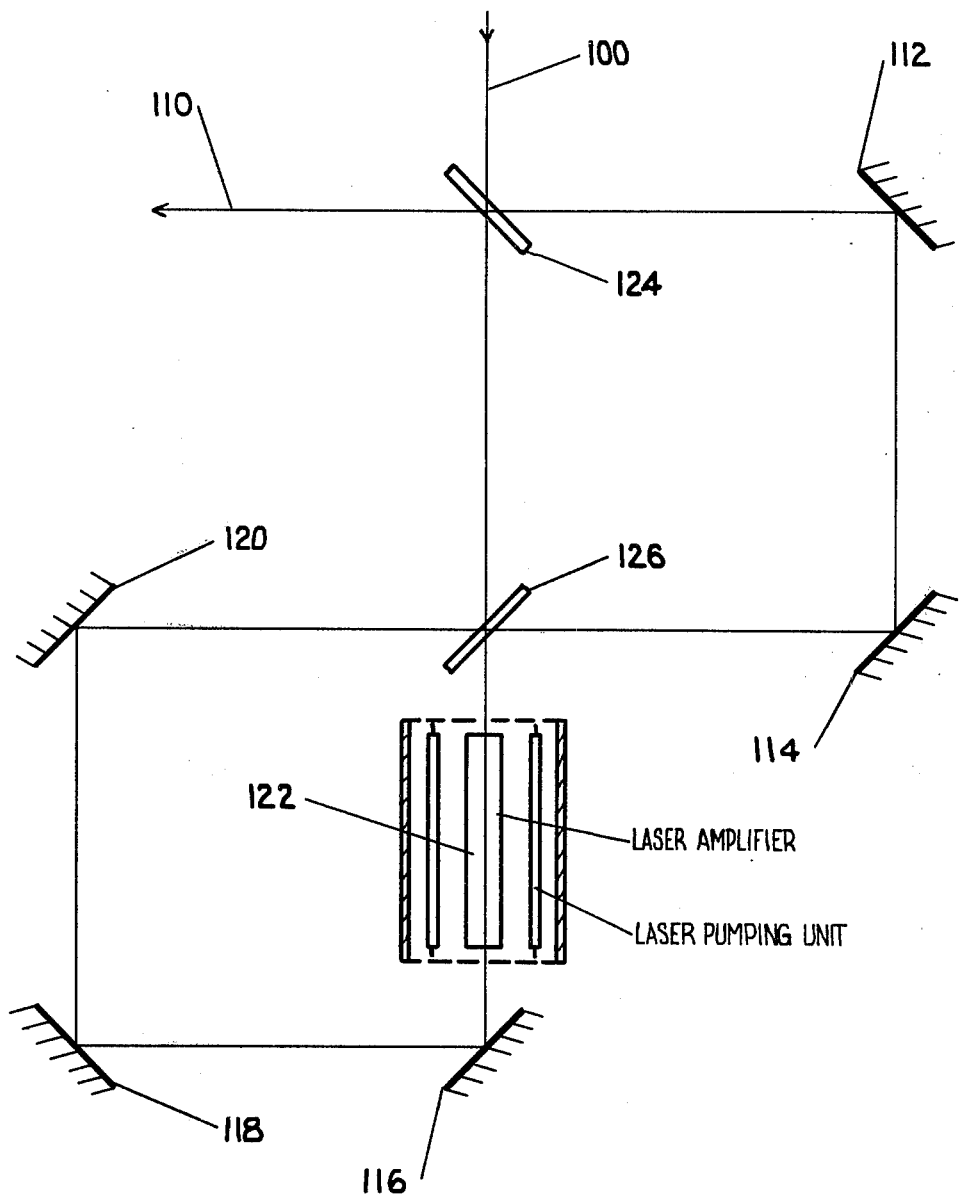

FIG. 4 — a diagram of a fourth embodiment of the invention.

In the electromagnetic theory of light, the electric and magnetic vectors are mutually perpendicular in a chargeless medium, and the plane of incidence is understood to be the plane containing the incident, reflected and transmitted beams.

It is known that the electric vector of a linearly polarized light beam can be decomposed into two components, the $p$ component being parallel to the plane of incidence, and the $s$ component being perpendicular to the plane of incidence.

The present disclosure utilizes the differences in transmittance and reflectance of polarizer plates to linearly polarized light. Currently available polarizer plates, which split a linearly polarized light beam into $p$ and $s$ components, have a relatively high efficiency. Transmittance of the $p$ component can be as high as 95% and reflectance of the $s$ component can be as high as 98%. It is also important as background to recognize that a quartz crystal plate in an optical path will rotate the plane of polarization of a linearly polarized beam through a specified angle in a reciprocal manner, i.e., when the beam is returned through the same plate in the opposite direction, its plane of polarization will be rotated back to its original orientation. The degree of rotation is determined by the thickness of the plate. A magnetic Faraday rotator, in contrast, is a nonreciprocal element such that a beam passing through it in one direction will have its plane of polarization rotated through a specified angle in a certain direction, and when that beam is passed back through the Faraday rotator its plane of polarization will be further rotated in the same direction through the same specified angle. Thus a beam passing through a 45° quartz plate will have its plane of polarization rotated 45° from its original position and when that beam is reflected back through the plate its plane of polarization will return to its original orientation. With a 45° Faraday rotator, a beam's plane of polarization will, in the beam's first pass, be rotated 45° in one direction, and on the return pass will be rotated a further 45° to be then 90° from its original orientation.

It must be appreciated that a disc type amplifier is sometimes utilized in laser systems, particularly towards the end of the system where the power flux is high. The disc type amplifier has the advantage that its components can be made larger in diameter than rods and spaced apart so that they have, for various reasons, a better capacity and larger life than rod amplifiers in the transmission of the high power flux. On the other hand, the disc type unit will amplify only light with a particular polarization and each unit is set for a predetermined orientation. It would be advantageous for the system to be described to be adaptable to both types of laser beam amplification.

In FIG. 1, one embodiment of the invention is illustrated along an optical axis 20. A laser amplifier 22 is disposed on this axis which has a light source 24 to emit a linearly polarized beam with polarization components $p$ and $s$ incident on a polarizer plate 26. A second polarizer plate 28 is disposed on axis 20 at a corner of a rectangular path which includes plate 26 and two mirrors 30 and 32. Beyond the amplifier 22 is a quartz plate 33 (90° reciprocal) and a second rectangular path which includes polarizer plates 34 and 36 on the optical axis and additional corner mirrors 38 and 40.

When in FIG. 1 a linearly polarized beam B on axis 20 with polarization components $p$ and $s$ is incident on polarizer plate 26 which transmits the $p$ component and reflects the $s$ component, the $p$ component is transmitted along optical axis 20 by polarizer plates 26 and 28 and amplified in laser amplifier 22. The component $s$, after reflection by plate 26, is reflected by mirrors 30 and 32 and returns to axis 20 as a time delayed beam $s^-$ (indicated by superscript $^-$). It is reflected by plate 28 and amplified in amplifier 22. The time delay is determined by the optical path 26, 30, 32, and 28. The beams are recombined by passing them through quartz plate 33 which rotates the plane of polarization 90°. By this rotation, the beam $p$ becomes $s$ and the beam $s^-$ becomes $p^-$. Polarizer 34 passes the new beam $s$ around the optical path 38, 40, and 36 back to the optical axis 20 while beam $p^-$ passes through polarizers 34 and 36 to the axis end. By this treatment, the beams $p^-$ and $s^-$ now have equal time delays and thus emerge in phase. It is essential in these optical detours that the optical paths be identical in length to the order of less than the wavelength of the amplified signal.

It will be seen that two beams have thus passed through the amplifier at different times, each being amplified individually and the combined amplified beams being merged. Thus the energy extraction from the pumped laser amplifier has been increased materially. In addition, if the original beam had such energy that it would be reaching the flux limitations of the particular lasing element, it will be clear that decomposition of the beam into $p$ and $s$ components has greatly reduced the energy of any single beam passing through. Thus greater energy extraction is accomplished while reducing the possibility of damage to the lasing element.

In FIG. 2, a modified and simplified optical system is illustrated which has definite advantages over the system shown in FIG. 1. A beam of origin 60 is incident on polarizer plate 62 which is arranged in a quadrangle which includes mirrors 64, 66, and 68. The beam exits at 70 after amplification. A laser amplifier rod 72 is in the beam axis between plate 62 and mirror 64.

When the linearly polarized beam 60 with components $p$ and $s$ is incident on polarizer plate 62, the $p$ component will be transmitted on the optical axis of the original beam while the reflected component $s$ is directed to mirror 68. Both beams proceed around the rectangular path. Transmitted beam $p$ passes through amplifier 72 first in point of time and then traverses the path set by mirrors 64, 66, and 68. Reflected beam $s$ is reflected through 68, 66, and 64 reaching the amplifier 72 in a time delayed path. Both beams reach the output axis 70 having been recombined by the plate 62. In this system, as in FIG. 1, only one polarization component is being amplified at a time; here by adjusting the path length 62, 68 to be greater than $\frac{1}{2}(n-1)L$, where $n$ is the index of refraction and L is the length of the lasing element. It will be seen that alignment is not a problem since the component beams $p$ and $s$ traverse the same optical path.

Because of amplifier energy depletion, the $p$ component, which is amplified first, undergoes a greater amplification than initially reflected $s$ component so that the angle of polarization at 70 differs from that of the original beam. If birefringence in the amplifier can be ignored, the original angle of polarization can be readily restored by a compensating rotation of the plane of polarization. Equilization of gain for the $p$ and $s$ components can also be achieved by introducing a second amplifier between mirrors 66 and 68.

As above pointed out, a disc type amplifier, as distinguished from a ruby rod laser, for example, will only amplify light having a particular linear polarization. The system of FIG. 2 can be utilized with disc amplifiers which accept only a particular linear polarization, e.g., +45° from the $p$ direction, by introducing Faraday rotator 74, diagrammatically shown between plate 62 and amplifier 72, and Faraday rotator 76 between the amplifier and mirror 64. Then rotator 74(76) rotates the $p(s)$ component 45° in a clockwise sense and rotator 76(74) rotates the $p(s)$ component 45° in an anticlockwise sense. After traversal of path 62, 64, 66, 68, 62 for the $p$ component and path 62, 68, 66, 64, 62 for the $s$ component, both components join in beam 70 with their original orientation. Each beam has been independently amplified since a pumped amplifier can deliver power to a beam incident from either end of its axis. Thus again the amplifier has been utilized in such a way that the gain has been increased.

A third modification of the invention is illustrated in FIG. 3. In this there is, on the optical axis 80, a polarizer plate 82, a 45° Faraday rotator 84 illustrated diagrammatically and a polarizer plate 86 leading to a laser amplifier 88 the output of which is directed to perpendicular mirror 90. The ultimate amplified output beam is on axis 92 at a right angle to axis 80.

In the operation of the modification of FIG. 3, the $p_1$ component of a beam having linear polarization is disposed on axis 80 to be incident on angled polarizer plate 82. Plate 82 transmits the $p_1$ component on axis 80. Faraday rotator 84 rotates the $p_1$ beam 45° and the beam is passed through polarizer plate 86 oriented to pass the new plane of polarization. The beam then passes through amplifier 88 to receive energy gain and is reflected by normal plate 90 to pass again through amplifier 88 on the return path to receive additional energy gain. This beam will pass polarizer plate 86 without alteration. Faraday rotator 84 will add a further 45° rotation and, accordingly, the resultant beam $(p_1 + 45° + 45°)$ is now $s_1$ polarized so that it will be reflected by polarizer plate 82 to the normal axis 92 leading to emergence at 92.

There is sometimes reflection from the utilization equipment and the present circuit in FIG. 3 is arranged to dispose of this reflected light in the following manner. Assuming reflection of light beams $p_2$, $s_2$, the $p_2$ beam is transmitted through plate 82 and lost, the $s_2$ beam is reflected by plate 82 in a normal direction along axis 80 undergoing a 45° rotation by 84 and reflected by polarizer plate 86 away from the axis 80. Thus there will be no amplifier depletion or other interference from the reflected beams.

A fourth modification of the invention is illustrated in FIG. 4 which splits the beam incident along optical axis 100 into four parts which are separately amplified before being recombined to emerge at 110. The apparatus consists of mirrors 112, 114, 116, 118, and 120, a laser amplifier 122, a polarizer plate 124 which transmits only $p$ polarized light, and a polarizer plate 126 canted 45° with respect to plate 124. Thus, a linearly polarized beam incident on plate 124 is split into its $p$ and $s$ components. The $p$ component continues on axis and is further split by plate 126 into components $s_p'$ and $p_p'$, say. The $s_p'$ component is reflected by plate 126 following the path between elements 126, 120, 118, and 116 before being amplified by amplifier 122 and arriving at polarizer plate 126 where it combines with the $p_p'$ component, which has followed the path between elements 126, 116, 118, 120, and 126 resulting in a $p$ polarized beam which traced the path between elements 126, 114, 112, and 124. The $s$ component reflected by plate 126, which has followed path 124, 112, 114, 126, is split by polarizer plate 126 into components $s_s'$ and $p_s'$ which follow the paths determined by elements 126, 116, 118, 120, 126 and 126, 120, 118, 116, 126, respectively, before being recombined into a $p$ polarized beam which traces the path determined by 126, 124 and combined with the amplified $p$ polarized beam from the amplified $s_p'$ and $p_p'$ components to form an amplified $p$ polarized beam emerging along output axis 110. Compensation for energy depletion can be achieved by inserting an amplifier identical to amplifier 122 between mirrors 120 and 118 to balance the beams. Thus with this system there have been four passes through the amplifier to achieve a maximum extraction of energy.

All of the individual components in the described optical circuits are available at optical supply houses.

What we claim is:

1. An optical system for use in a lasing system which comprises:
   a. a laser amplifier on a defined optical axis,
   b. a pair of polarizer plates on said axis on each side of said amplifier,
   c. means for forming an extended optical path between the first and second of the polarizer plates in each pair, and
   d. a rotator on said axis between said amplifier and said second pair to rotate the plane of polarization of a beam on said axis,
   whereby a linearly polarized light beam on said axis will be decomposed into two beam components out of phase in time, passed through said amplifier and brought together in phase in time to merge as a single amplified beam of linearly polarized light.

2. An optical system for use in a lasing system which comprises:
   a. a source of a linearly polarized light beam,
   b. a polarizer plate for decomposing said beam into a $p$ component and an $s$ component,
   c. a closed light path having a plurality of straight legs leading from and to said polarizer plate for conducting said components in opposite directions from said polarizer plate around said path and back to said plate,
   d. a laser amplifier in at least one of said legs to amplify said beam components sequentially as they traverse said path, and
   e. an outlet axis leading from said plate, said components being recombined at said plate after traversing said closed light path, and being emitted along said outlet axis.

3. An optical system as defined in claim 2 in which said laser amplifier comprises a disc type amplifier and a Faraday rotator on each side of said disc type amplifier to provide proper orientation of said amplifier and common orientation of said recombined beams at said outlet axis.

4. An optical system for use in a lasing system which comprises:
   a. a source of a linearly polarized light beam,
   b. a first polarizer plate angled to said beam for decomposing said beam into a $p$ component and an $s$ component,
   c. a light path receiving one of said components from said polarizer plate terminating in a reflector normal to the axis of said path,
   d. a 45° Faraday rotator in said path, and
   e. a laser amplifier between said rotator and said reflector,
   wherein the retained component from said first polarizer plate is amplified sequentially in passing through said amplifier on the way to and from said reflector, and is twice rotated 45° at said rotator to be reflected from said first polarizer plate as an amplified output beam on an output utilization axis.

5. An optical system as defined in claim 4 wherein in a second polarizer plate is disposed in said light path and oriented to pass the rotated beam, said second polarizer being further oriented to reflect away from said path any reflected beams resulting from utilization of said output beam.

6. An optical system for use in a lasing system which comprises:
   a. a source of a linearly polarized light beam,
   b. first and second polarizer plates disposed in spaced relationship along a beam path and oriented at an angle to each other and to the beam on said path,
   c. means forming a first closed light path having a plurality of straight legs with said first and second polarizer plates at two corners of said path,
   d. means forming a second closed light path having a plurality of straight legs with said second polarizer plate at one corner thereof, and
   e. a laser amplifier in one of said legs,
   said beam being decomposed respectively by said polarizer plates into $p$ beams and $s$ beams and being recombined after sequential passage in the same and in opposite directions through said amplifier in said light path.

7. The system set forth in claim 6 wherein said first and second polarizer plates are at two adjacent corners of said first closed light path.

8. The system set forth in claim 6 wherein said laser amplifier is in one of the legs of said second light path.

9. An optical system for use in a lasing system which comprises:
   a. a source of a linearly polarized light beam,
   b. first and second polarizer plates disposed in spaced relationship along a beam path and oriented at an angle to each other and to the beam on said path,
   c. means including two mirrors to form a quadratic closed path with said first and second polarizer plates at two adjacent corners thereof,
   d. means including three mirrors to form a second quadratic closed light path with said second polarizer plate at one corner thereof, and
   e. a laser amplifier in at least one of the legs of said second quadratic path,
   wherein said light beam is decomposed respectively by said polarizer plates into $p$ beams and $s$ beams and said beams recombined into an output beam after sequential passage in opposite directions through said amplifier in said second quadratic light path.

10. An optical system to obtain increased output from a flux limited lasing system and increased energy extraction from a pumped lasing element which comprises:
    a. a laser system having a laser amplifier element through which a laser beam is to be passed,
    b. an optical system having an axis on which said lasing element is positioned,
    c. means including a polarizer plate in said optical system to directly decompose a linearly polarized laser beam into components, and
    d. means including a time delay path for at least one of said components in said system to pass said components through said laser amplifier sequentially in a predetermined time sequence, said time delay path originating at said polarizer plate to divert said at least one component away from and back to said optical axis.

11. An optical system as defined in claim 10 in which said means to recombine said beam components comprises a rotator plate on said axis, polarizer plates spaced along said axis and means forming a time delay path originating at one of said polarizer plates and terminating at the other of said polarizer plates.

12. An optical system as defined in claim 10 in which means to decompose said beam into components comprises a first and second polarizer plate spaced along said axis, and means forming a time delay path originating at said first polarizer plate and terminating at said second polarizer plate.

13. An optical system to obtain increased output from a flux limited lasing system and increased energy extraction from a pumped lasing element which comprises:
   a. a laser system having a laser amplifier element through which a laser beam is to be passed,
   b. an optical system having an axis on which said lasing element is positioned,
   c. means in said optical system to decompose a linearly polarized laser beam into components,
   d. means in said system to pass said components through said laser amplifier sequentially in a predetermined time sequence, and
   e. means to recombine said beam components into a single laser beam,
   said means to recombine said beam components comprising a rotator plate on said axis, polarizer plates spaced along said axis, and means forming a time delay path originating at one of said polarizer plates and terminating at the other of said polarizer plates.

14. An optical system for use in a lasing system which comprises:
   a. a source of a linearly polarized light beam,
   b. a polarizer plate for decomposing said beam into a $p$ component and an $s$ component,
   c. a closed light path having a plurality of straight legs leading from and to said polarizer plate for conducting said components in opposite directions from said polarizer plate around said path and back to said plate,
   d. a laser amplifier in at least one of said legs to amplify said beam components sequentially as they traverse said path, and
   e. an outlet axis leading from said plate, said components being recombined at said plate after traversing said closed light path and being emitted along said outlet axis,
said laser amplifier comprising a disc type amplifier and a Faraday rotator on each side of said disc type amplifier to provide proper orientation of the plane of polarization of beam components directed to said amplifier and perpendicular polarization of said recombined beam components at said outlet axis.

15. A laser amplifier system comprising:
   a. a light source,
   b. a first polarizer plate angled to said light source to provide a linearly polarized light beam,
   c. a light path receiving said light beam from said polarizer plate and terminating in reflector means normal to said path,
   d. means disposed in said path to rotate said light beam by an angle of forty-five degrees during passage therethrough in either direction,
   e. a laser amplifier disposed in said path, and
   f. a second polarizer plate disposed in said path and oriented to pass said light beam,
wherein said light beam is sequentially amplified in passing through said amplifier to and from said reflector means, and is twice rotated by said rotating means to be reflected from said first polarizer plate as an amplified output beam on a utilization axis, and
wherein reflected beams incident on said first polarizer resulting from utilization of said output beam are split into $s$ and $p$ components, a one of said components being directed away from said light path by said first polarizer plate, the other of said components being passed onto said light path, rotated by said rotating means and then directed away from said light path by said second polarizer path.

16. The amplifier set forth in claim 15 wherein said rotating means is disposed between said first and second polarizer plates.

17. In a pulsed laser amplifier system, the combination comprising first and second polarizers disposed on a bidirectional beam path and oriented with respect to said beam path such that said first polarizer passes light polarized at an angle of 45° with respect to light passed by the other of said polarizers, and means disposed in said path between said first and second polarizers to rotate the plane of polarization of linearly polarized light by an angle of 45° during passage therethrough in either direction.

18. The combination set forth in claim 17 further comprising reflectance means disposed at one end of said bidirectional beam path normal thereto, such that a beam of light traveling on said path and incident on said reflectance means is reflected back onto said path.

19. The combination set forth in claim 18 further comprising means disposed in said beam path between said reflectance means and the one of said polarizers disposed in said path nearer said reflectance means for modifying a light beam passing therethrogh in a preselected manner, whereby a light beam traveling on said path passes sequentially through said modifying means to and from said reflectance means.

20. The combination set forth in claim 18 wherein said rotating means comprises a Faraday rotator.

* * * * *